(12) United States Patent
Won et al.

(10) Patent No.: US 7,941,500 B2
(45) Date of Patent: May 10, 2011

(54) METHOD AND DEVICE FOR MANAGING CONTENT, STORAGE MEDIUM, AND ADAPTIVE CONTENT PLAYING METHOD USING THE SAME

(75) Inventors: Jong-eun Won, Seoul (KR); Young-chul Sohn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 225 days.

(21) Appl. No.: 11/540,647

(22) Filed: Oct. 2, 2006

(65) Prior Publication Data

US 2007/0185972 A1   Aug. 9, 2007

(30) Foreign Application Priority Data

Feb. 8, 2006   (KR) ..................... 10-2006-0012053

(51) Int. Cl.
*G06F 15/16* (2006.01)
(52) U.S. Cl. ......... 709/217; 709/246; 709/231; 709/248
(58) Field of Classification Search .......... 709/246–247, 709/219, 217, 231
See application file for complete search history.

(56) References Cited

U.S. PATENT DOCUMENTS

| | | | |
|---|---|---|---|
| 6,560,651 B2 | 5/2003 | Katz et al. | |
| 7,349,976 B1 * | 3/2008 | Glaser et al. | 709/231 |
| 7,610,597 B1 * | 10/2009 | Johnson et al. | 725/32 |
| 7,689,510 B2 * | 3/2010 | Lamkin et al. | 705/51 |
| 2002/0069218 A1 | 6/2002 | Sull et al. | |
| 2002/0091834 A1 | 7/2002 | Isozu et al. | |
| 2002/0104092 A1 | 8/2002 | Arai et al. | |
| 2002/0156842 A1 * | 10/2002 | Signes et al. | 709/203 |
| 2004/0221311 A1 * | 11/2004 | Dow et al. | 725/52 |
| 2004/0226034 A1 * | 11/2004 | Kaczowka et al. | 725/9 |
| 2005/0010653 A1 * | 1/2005 | McCanne | 709/219 |
| 2006/0161635 A1 * | 7/2006 | Lamkin et al. | 709/217 |
| 2006/0218294 A1 * | 9/2006 | Rosenberg | 709/231 |
| 2006/0282501 A1 * | 12/2006 | Bhogal et al. | 709/203 |
| 2007/0130012 A1 * | 6/2007 | Yruski et al. | 705/14 |
| 2007/0220577 A1 * | 9/2007 | Kongalath | 725/131 |
| 2008/0034041 A1 * | 2/2008 | Kang et al. | 709/205 |
| 2008/0234844 A1 * | 9/2008 | Boustead et al. | 700/94 |

FOREIGN PATENT DOCUMENTS

| | | |
|---|---|---|
| EP | 1 213 926 A2 | 6/2002 |
| EP | 1 398 720 A2 | 3/2004 |
| EP | 1 460 551 A1 | 9/2004 |
| JP | 2001-339680 A | 12/2001 |
| JP | 2004-310124 A | 11/2004 |
| JP | 2004-336310 A | 11/2004 |
| KR | 10-2004-0103680 A | 12/2004 |
| WO | 2004/084557 A1 | 9/2004 |
| WO | 2005/086028 A1 | 9/2005 |

* cited by examiner

*Primary Examiner* — Salad Abdullahi
(74) *Attorney, Agent, or Firm* — Sughrue Mion, PLLC

(57) ABSTRACT

A content management method includes transmitting content from a content provider device to a client device over a predetermined network; and adding additional information comprising original content location information of the content transmitted to the client device and elapsed playing time information of the content. A content management device includes a communication module which transmits content to, receives content from, or transmits content to and receives content from a device connected over a predetermined network; an additional information edit processing unit which generates additional information comprising original content location information of the content transmitted by the communication module and elapsed playing time information of the content, and inserts the additional information into the transmitted content; and a storage unit which stores the content into which the additional information has been inserted.

14 Claims, 7 Drawing Sheets

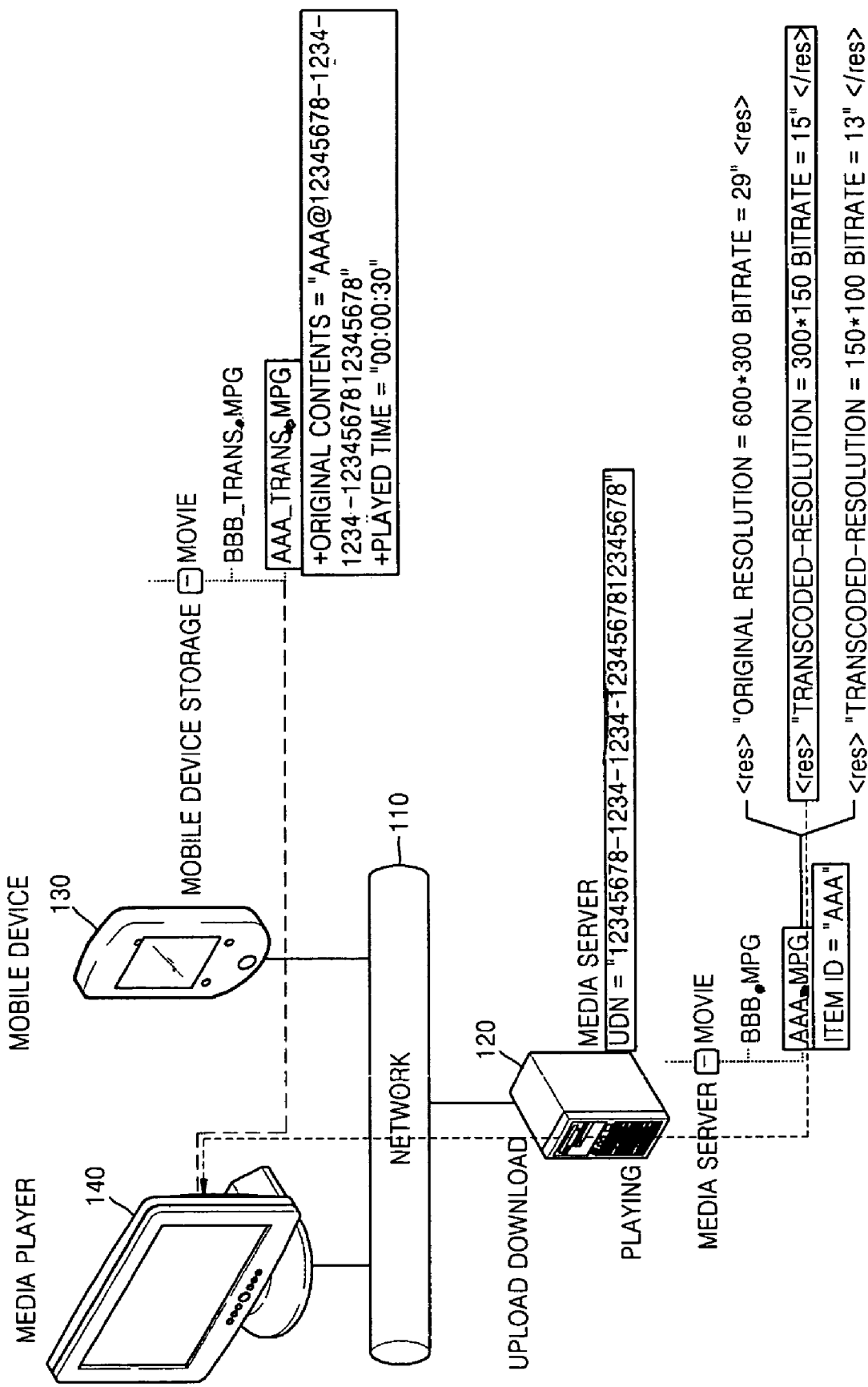

FIG. 8

```
Media Server's Item Information

<item id="AAA" parentID="AA" restricted="1" refID="AAAA">
<dc:title>AAA</dc:title>
<upnp:class>object.item.videoItem.movie</upnp:class>
<res protocolInfo="http-get:*:video/mpeg:DLNA.ORG_PN=MPEG_PS_NTSC;DLNA.ORG_OP=01;DLNA.ORG_CI=0" duration="00:01:00"
resolution="720x480" size="40644608">http://192.168.0.1:5555/TestMedia/AAA.mpg
</res>
<res protocolInfo="http-get:*:video/mpeg:DLNA.ORG_PN=MPEG_PS_NTSC;DLNA.ORG_OP=00;DLNA.ORG_CI=1"
bitrate="291250" duration="00:01:00" resolution="360x240">http://192.168.0.1:5555/TestMedia/AAA_TRANS2.mpg
</res>
<Played time = "00:00:30"/>

</Item>
</DIDL-Lite>
```

FIG. 9

```
Mobile Device's Item Information

<item id="mobile003" parentID="mobile00" restricted="1" refID="mobile01">
<dc:title>AAA_UPLOADED</dc:title>
<upnp:class>object.item.videoItem.movie</upnp:class>

<res protocolInfo="http-get:*:video/mpeg:DLNA.ORG_PN=MPEG_PS_NTSC;DLNA.ORG_OP=00;DLNA.ORG_CI=1"
bitrate="291250" duration="00:01:00" resolution="360x240">http://192.168.0.2:4444/Mobile Storage/AAA_TRANS2.mpg
</res>
<Original Content = "AAA@MediaServerUDN" />
<Played time = "00:00:30"/>

</Item>
</DIDL-Lite>
```

METHOD AND DEVICE FOR MANAGING CONTENT, STORAGE MEDIUM, AND ADAPTIVE CONTENT PLAYING METHOD USING THE SAME

CROSS-REFERENCE TO RELATED APPLICATIONS

This application claims priority from Korean Patent Application No. 10-2006-0012053, filed on Feb. 8, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to content service, and more particularly, to managing a storage location of original content and elapsed playing time of transmitted content using additional information.

2. Description of the Related Art

As home networks or local networks have developed, media content provided from a media server over a network can be viewed by various types of devices such as mobile devices and media players.

In general, mobile devices have smaller displays having limited resolution those that of media players, and there is a significant difference in display performance depending on types of the mobile devices. Therefore, a media server is required to transcode content into a format appropriate to the device's performance.

However, since in the related art, transcoded content and original content are managed separately, when a device playing content is changed to another device with different resolution, there is a problem that a storage location of the original content cannot be easily detected on the network. Moreover, because it cannot be known how long the currently viewed content has been played, it is difficult to accurately and continuously play the same content after changing the device.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and a device for managing a storage location of original content and elapsed playing time of transmitted content using additional information. The present invention also provides a storage medium, and an adaptive content playing method using the same.

According to an aspect of the present invention, there is provided a content management method comprising: transmitting content from a content provider device to a client device over a predetermined network; and adding additional information comprising original content location information of the content transmitted to the client device and elapsed playing time information of the content.

According to another aspect of the present invention, there is provided a content management device comprising: a communication module which transmits/receives content to/from a device connected over a predetermined network; an additional information edit processing unit which generates additional information comprising original content location information of the content transmitted through the communication module and elapsed playing time information of the content and inserts the additional information into the transmitted content; and a storage unit which stores the content into which the additional information has been inserted.

According to still another aspect of the present invention, there is provided a computer readable storage medium which stores program code for inserting additional information into content transmitted from a content provider device over a predetermined network, the additional information comprising original content location information of the content in the content provider device and elapsed playing time information of the content.

According to yet another aspect of the present invention, there is provided an adaptive content playing method comprising: inserting additional information into stored content which has been transmitted from a content provider device over a predetermined network, the additional information comprising original content location information of the stored content and elapsed playing time information of the stored content; detecting an original content provider device and an original content storage location using the original content location information included in the additional information; and playing the original content from a time point corresponding to the elapsed playing time information included in the additional information after changing a device to play the content.

The original content location information may comprise identification information of source content of the stored content and identification information of the content provider device.

After elapsed playing time of the content is measured, the elapsed playing time information may be updated to the measured elapsed playing time.

The additional information may be included in metadata of the content.

BRIEF DESCRIPTION OF THE DRAWINGS

The above aspects of the present invention will be more apparent by describing exemplary embodiments of the present invention with reference to the attached drawings, in which:

FIG. 7 is a view schematically illustrating a process of playing content after changing a playing device from a mobile device to a media player using the content management method, according to an exemplary embodiment of the present invention;

FIG. 8 shows source code for detecting original content of a media server using additional information using the content management method according to an exemplary embodiment of the present invention; and FIG. 9 shows source code for inserting additional information into content in a mobile device using the content management method according to an exemplary embodiment of the present invention.

DETAILED DESCRIPTION OF EXEMPLARY EMBODIMENTS

Hereinafter, the present invention will be described in detail by explaining exemplary embodiments of the invention with reference to the attached drawings.

Figure 1:
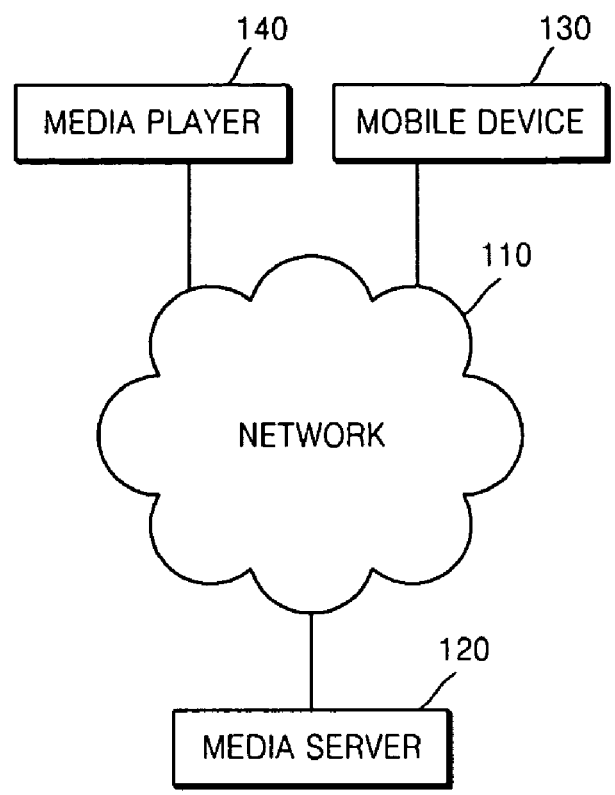
FIG. 1 is a configuration diagram of a content service system according to an exemplary embodiment of the present invention.

FIG. 1 is a configuration diagram of a content service system according to an exemplary embodiment of the present invention, which includes a network 110, a media server 120, a mobile device 130, and a media player 140.

Although, for convenience of explanation, client devices connected to the network 110 are represented by a single mobile device 130 and a single media player 140 in FIG. 1, a plurality of various wired/wireless devices can be connected to the network 110 as well.

The network 110 provides wired and wireless network services, and, for example, it can be configured as a Universal Plug and Play (UPnP) based home network. However, the present invention is not limited to a UPnP based home network, and various network access technologies such as Digital Living Network Alliance (DLNA) can be applied to the present invention.

A UPnP based home network access technology is made by expanding the Plug and Play (PnP), which is chosen for peripheral device access to Microsoft Windows by the Microsoft Corporation, such that the PnP can be applied to more varied devices. Devices connected to the UPnP based network can be categorized into control devices and controlled devices according to the control subject. The control devices search or control other devices, and the controlled devices execute commands transmitted from the control devices.

Access between devices in the UPnP based network is performed using the following procedures.

Addressing: since the UPnP is an Internet Protocol (IP) based network, each device requires an IP address and an IP address first has to be allocated to a device to be connected to the UPnP network. When the device is connected to the network for the first time, the device locates a dynamic host configuration protocol (DHCP) server to obtain an IP address. In this case, the device becomes a DHCP client.

Discovery: after each device is allocated an IP address by addressing, it is required to detect devices to be controlled. In this regard, a control device detects devices to be controlled using the simple service discovery protocol (SSDP). The control device detects potential devices, and a certain controlled device responds to the detection. When the controlled device accesses the network, the other devices are informed, and also, the other devices are periodically informed whether the controlled device continues accessing the network.

Description: when a device is detected, a service the device has to perform must be recognized. In this regard, when the control device detects the controlled device, the controlled device sends a uniform resource locator (URL) in which the description of the controlled device is stored to the control device, and the control device reads the device description in the form of an eXtensible Markup Language (XML) document. This document includes information about a manufacturer of the device, product information (such as a model name, a serial number, etc.), a service list, and the like.

Control: the control device analyzes the services specified in the device description after taking the device description from the controlled device, and then controls the controlled device by sending an appropriate action thereto. In this case, XML/simple object access protocol (SOAP) is used.

Eventing: states of the device can be changed frequently in the home network according to the ambient atmosphere. Since such changes may provide a user with important information, the changes are defined as events in the UPnP. The control device pays attention to a change in the state of the controlled device, and the controlled device sends the control device an event message when the state of the controlled device changes. An event consists of a pair of name and value and uses a general event notification architecture (GENA) protocol in the XML format.

Presentation: The control device can read a hypertext markup language (HTML) page related to the controlled device. The HTML page shows a user interface related to use of the controlled device. Through the user interface, it is possible to control the controlled device or recognize the state of the controlled device.

Using the UPnP based network access technology, device control and data transmission/receipt between the devices are possible.

Figure 2:
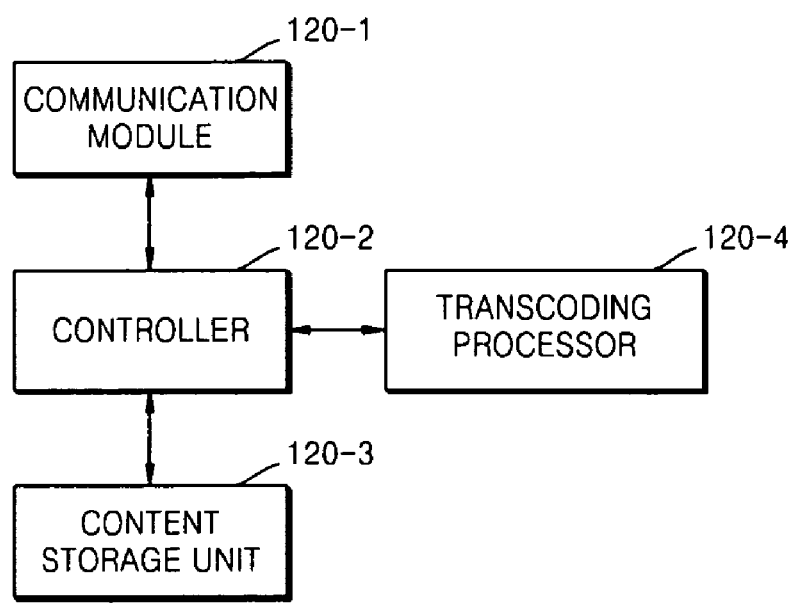
FIG. 2 is a block diagram showing in detail a media server of FIG. 1, according to an exemplary embodiment of the present invention.

The media server 120 provides media content to a device connected to the network 110. FIG. 2 shows in detail a configuration of the media server 120, according to an exemplary of the present invention.

As illustrated in the exemplary embodiment of FIG. 2, the media server 120 includes a communication module 120-1, a controller 120-2, a content storage unit 120-3, and a transcoding processor 120-4.

The communication module 120-1 includes hardware and software for executing data communication between the media server 120 and devices connected to the network 110. In the current embodiment of the present invention, connection and data transmission/receipt between the devices are performed according to the UPnP based network access technology.

The content storage unit 120-3 contains audio and video content in various types of formats. Typically, the format may be Moving Picture Experts Group (MPEG), Audio Video Interleave (AVI), QuickTime (MOV), video compact disk (DAT), video objects (VOB), MPEG-2 video (M2V), Advanced Systems Format (ASF), and RealMedia (RM). However, the content storage unit 120-3 may include content in other formats as well.

The transcoding processor 120-4 consists of hardware and software that convert a format of multimedia data. In particular, the transcoding processor 120-4 converts resolution to be compatible with a device that receives the content.

The controller 120-2 comprehensively controls the media server 120. The controller 120-2 browses media information managed by the media server 120 and transmits it to the control device connected to the network 110. Also, the controller 120-2 searches and reads required media content from the content storage unit 120-3, and then, if necessary, controls the transcoding processor 120-4 to convert resolution and transmit the converted resolution to the control device which requires the content, through the communication module 120-1.

Figure 3:
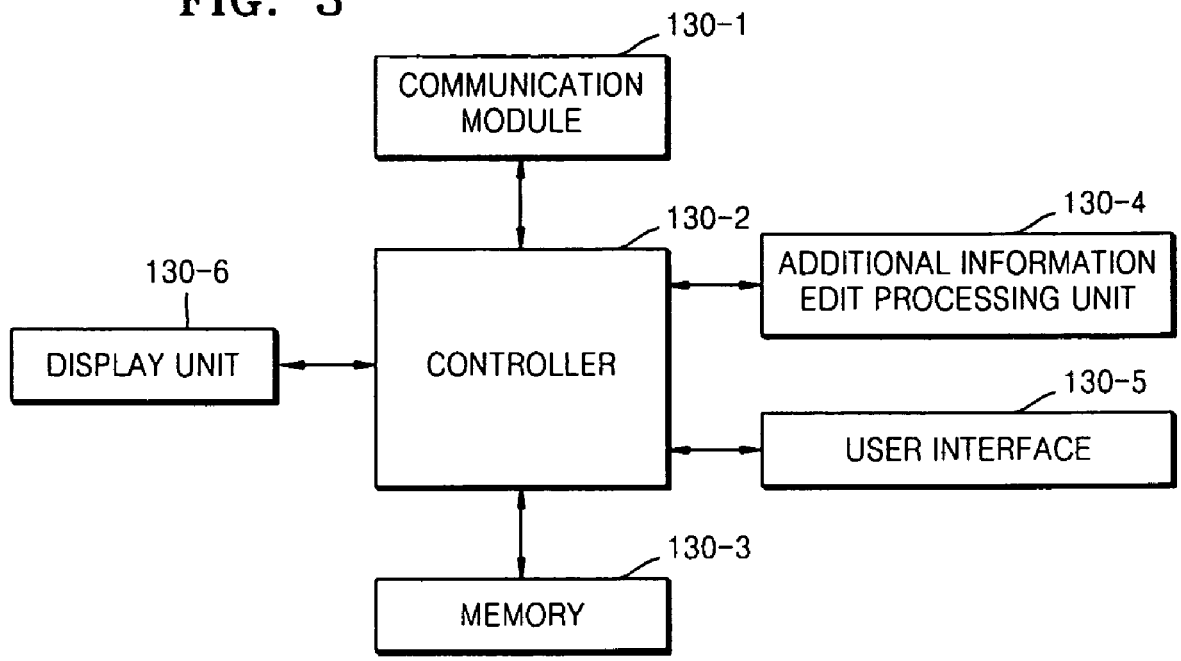
FIG. 3 is a block diagram showing one of a plurality of client devices which is connected to a network of FIG. 1, according to an exemplary embodiment of the present invention.

FIG. 3 is a block diagram showing one of a plurality of the client devices connected to the network 110 of FIG. 1, according to an exemplary embodiment of the present invention. The mobile device 130 and the media player, which are some of the client devices connected to the network 110, have the same configuration, as illustrated in FIG. 3.

According to the current embodiment of the present invention, the client device includes a communication module 130-1, a controller 130-2, a memory 130-3, an additional information edit processing unit 130-4, a user interface 130-5, and a display unit 130-6.

The communication module 130-1 includes hardware and software for executing data communication between the client device and other devices connected to the network 110. In the current embodiment of the present invention, connection and data transmission/receipt between the devices are performed according to the UPnP based network access technology.

Content received through the communication module 130-1 is stored in the memory 130-3.

The additional information edit processing unit 130-4 generates additional information including location information of original content and elapsed playing time information of the content received through the communication module 130-1 and inserts the additional information into the received content. The original content location information includes original content identification information and identification information of a content provider of the received content.

For example, when "AAA_TRANS.MPG" content is selected and copied from the media server 120, additional information is inserted into the content. The additional information includes the original content location information and the elapsed playing time information (played time) as shown below.
  Original Contents="AAA@12345678-1234-1234-1234567812345678"
  Played Time="00:00:00"

"AAA" of the original content location information denotes content identification information, and "12345678-1234-1234-1234567812345678" indicates the identification information of a provider device (a media server) that provides the original content. Specifically, such additional information is inserted into metadata of the corresponding content.

When the content start to be played, the additional information edit processing unit 130-4 measures an elapsed playing time, and updates the elapsed playing time of the additional information to the measured elapsed playing time.

The user interface 130-5 is a control input unit for inputting a user command to the client device to request/desire content.

The display unit 130-6 displays a graphic user interface, browse information, and played content, and may be a liquid crystal display.

The controller 130-2 controls the client devices comprehensively. The controller 130-2 performs a series of processes though which the client device accesses the media server 120 and searches the content desired according to the user command input through the user interface 130-5, requests the media server 120 to transmit the searched content, and then plays the received content.

Figure 4:
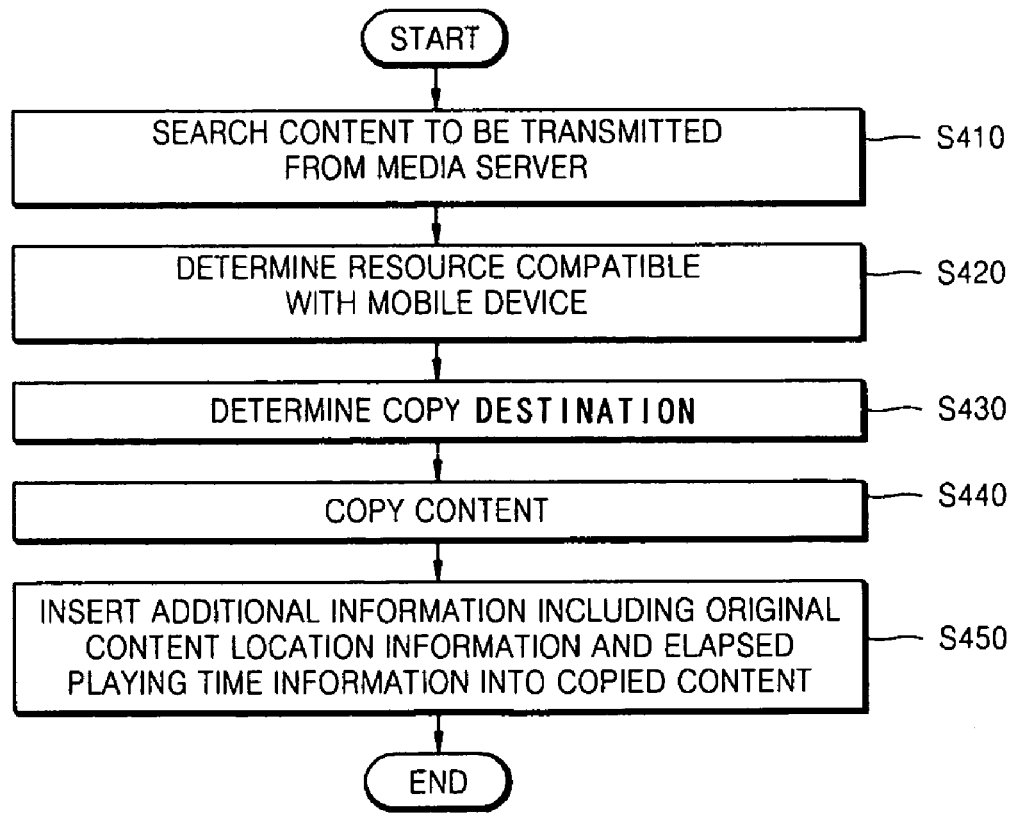
FIG. 4 is a flowchart illustrating a process of transmitting content from the media server to a mobile device using a content management method according to an exemplary embodiment of the present invention.

A process of transmitting content from the media server 120 to the mobile device 130 and managing the content will be described with reference to FIGS. 4 and 6.

A user accesses the media server 120 on the network 110 using a user interface in the mobile device 130 or the media player 140, and searches desired content AAA.MPG (S410).

The media server 120 displays different resources with a variety of resolutions according to transcoding for the desired content AAA.MPG.

A resource "Resolution=300*150" having a resolution compatible with the mobile device 130 is determined (S420). The resource "Resolution=300*150" can be chosen manually by using the user interface. According to circumstances, the process may be designed such that the resource with the resolution compatible with the mobile device 130 can be automatically determined.

Then, a copy destination "Mobile Device Storage/Movie" is determined (S430).

When a copy execution command is selected using the user interface, the media server 120 transmits the resource of the content selected by the user to the mobile device 130, and the transmitted resource is copied to the copy destination of the mobile device 130 (S440).

According to an exemplary embodiment of the present invention, to manage the content efficiently, additional information including location information of the original content and elapsed playing time information of the content is added to the content copied to the mobile device 130 (S450). The original content location information and the elapsed playing time information are as follows:
  Original Contents="AAA@12345678-1234-1234-1234567812345678"
  Played Time="00:00:00"

"AAA" of the original content information denotes content identification information, and "12345678-1234-1234-1234567812345678" indicates identification information of the media server 120 that provides the original content. In particular, the additional information is added to metadata of the content.

When the content "AAA" is played by the mobile device 130, the elapsed playing time of the content is measured to update the additional information "Played Time".

Figure 6:
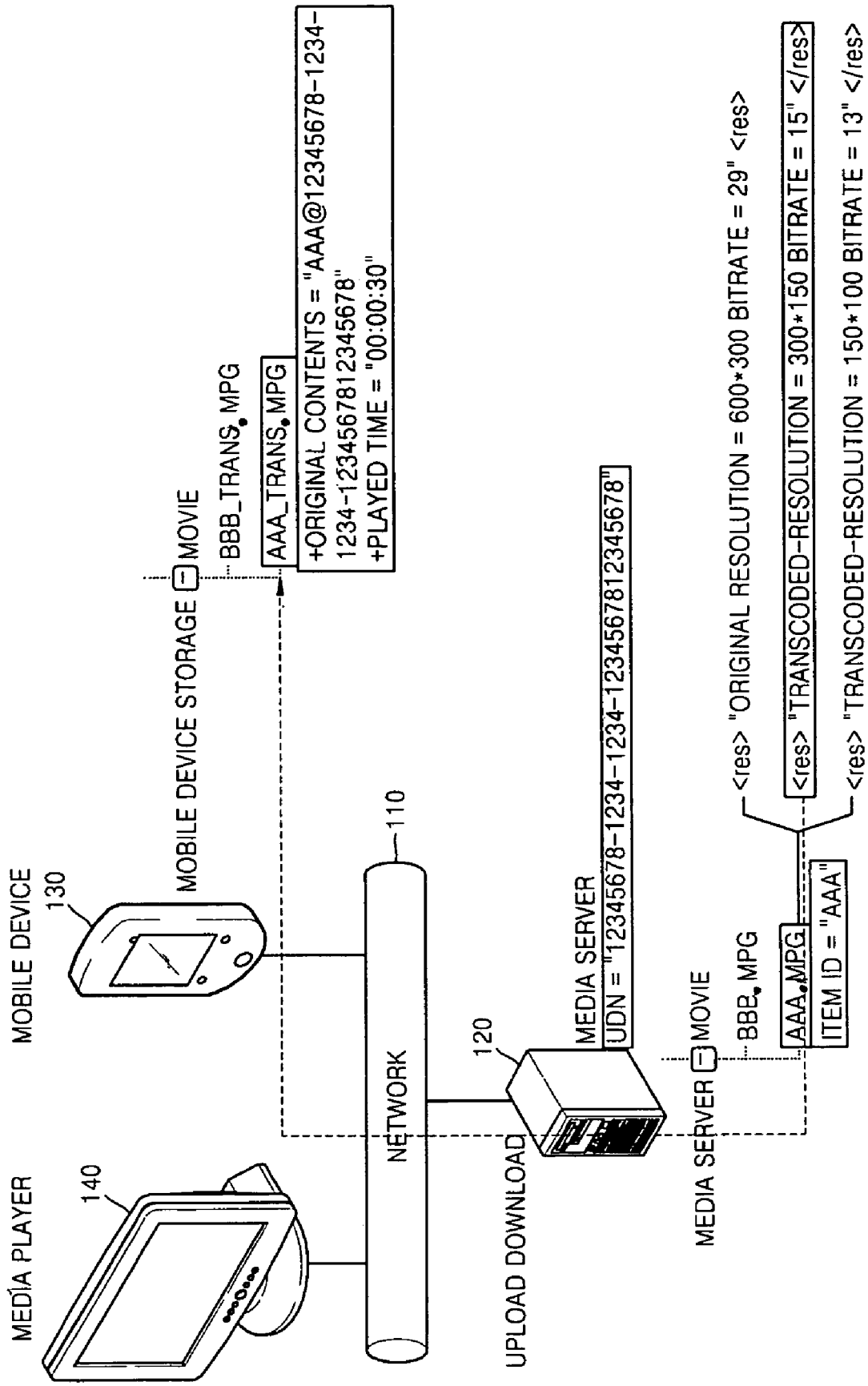
FIG. 6 is a view schematically illustrating a process of transmitting content from the media server to the mobile device using a content management method according to an exemplary embodiment of the present invention.

If the content "AAA" is played for 30 seconds by the mobile device 130, the elapsed playing time information included in the additional information will be Played Time="00:00:30" as shown in FIG. 6.

FIG. 9 shows an example of source code for inserting the additional information into the content in the mobile device 130 when the content is downloaded to the mobile device 130, using a content management method according to an exemplary embodiment of the present invention.

Figure 5:
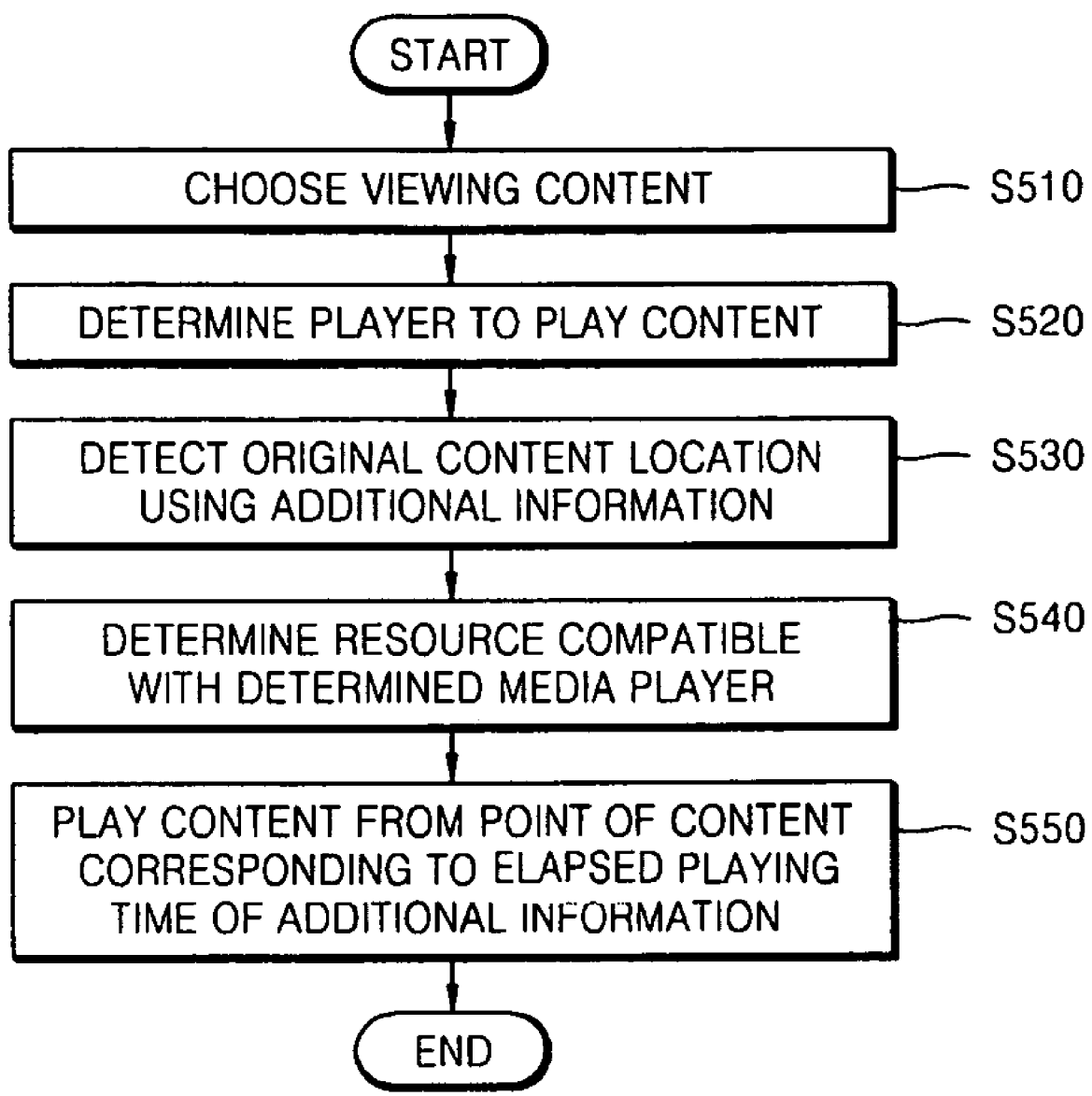
FIG. 5 is a flowchart illustrating an adaptive content playing method according to an exemplary embodiment of the present invention.

An adaptive content method according to an exemplary embodiment of the present invention will be described with reference to FIGS. 5 and 7. In this case, the content "AAA" transmitted to the mobile device 130 with a relatively low resolution has been displayed by the mobile device 130 and the user changes the mobile device 130 to the media player 140 which has a relatively high resolution and continuously views the content "AAA".

The user detects and chooses content AAA_TRANS.MPG that the user has been watching from the mobile device 130 using the user interface of the mobile device 130 or media player 140 (S510).

Then, a player to play the content AAA_TRANS.MPG is determined as the media player 140 (S520). If the user interface is included in the media player 140, the media player 140 is chosen as a default player.

A storage location of the original content to be played is detected using the additional information inserted into the content chosen in operation S510 (S530). For example, the additional information of the selected content is as follows:
  Original Contents="AAA@12345678-1234-1234-1234567812345678"

Played Time="00:00:30"

In this case, a device that provides the original content and has a device ID that is "12345678-1234-1234-1234567812345678" can be detected, and the original content that has a content ID, "AAA", can be detected. As the result, the storage location of the original content to be played can be detected.

The resource having a resolution compatible to the media player 140 which is chosen as the player to play the content is automatically selected from the original content which has been detected using the additional information (S540). According to circumstances, the resource having a resolution compatible to the media player 140 may be manually chosen using the user interface.

The media player 140 plays the content from the point of the content which corresponds to the elapsed playing time information included in the additional information (S550). Specifically, when the played time information of the additional information that has been inserted into the content "AAA" is Played Time="00:00:30", the media player 140 plays resource content having a resolution compatible to the media player 140 from a point corresponding to a 30 seconds elapsed playing time of the content.

Consequently, the content is stopped playing to change the mobile device 130 which has been playing the content to another device, the content can be continuously played by the media player 140 from the point of the content at which the content was stopped.

As described above, according to the present invention, an original content storage location and elapsed playing time information of transmitted content are managed using additional information, and thus, when a device which is playing the content is changed to another device having a different resolution, an original content storage location can be easily detected on a network using the additional information. In addition, the elapsed playing time information of the content can be detected so that the same content can be continuously played after changing the device to play the contents.

The present invention can be embodied, for example, as a method, a device, or a system. When the present invention is embodied as software, essential units of the present invention are necessarily code segments for performing required operations. Also, a computer program of the code segments can be stored in a processor readable medium and transmitted through computer data signals combined with carrier waves over a transmission medium or a communication network. The processor readable medium includes any medium that can store or transmit data. Examples of the processor readable medium include an electronic circuit, a semiconductor memory device, read only memory (ROM), Flash memory, erasable ROM (EROMs), floppy disk, optical disk, hard disk, optical fiber medium, a radio frequency (RF) network, etc. The computer data signals include any signals which can be transmitted through a transmission medium such as an electronic network channel, optical fiber, air, an electromagnetic field, an RF network, etc.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A content management method comprising:
   transmitting content from a content provider device to a client device over a network;
   generating, by the client device, additional information comprising original content location information of the content at the content provider and information on elapsed playing time of the content on the client device;
   inserting the additional information into the transmitted content at the client device, and playing original content from a point corresponding to the information on elapsed playing time of the content on the client device comprised in the additional information after switching to a different device to play the original content; and
   measuring elapsed playing time of the content and updating the elapsed playing time information to the measured elapsed playing time.

2. The method of claim 1, wherein the original content location information comprises identification information of original content and identification information of the content provider device.

3. The method of claim 1, wherein the content comprises transcoded content.

4. The method of claim 1, wherein the additional information is inserted into metadata of the content.

5. A content management device comprising:
   a communication module which transmits content to a client device connected over a network;
   an additional information edit processing unit at the client device which generates additional information comprising original content location information of the content at a content provider and information on elapsed playing time of the content on the client device, and inserts the additional information into the content; and
   a storage unit at the client device which stores the content into which the additional information has been inserted,
   wherein the original content is played by a different device from a point corresponding to the information on elapsed playing time of the content on the client device comprised in the additional information after switching to a different device to play the original content, and
   wherein after elapsed playing time of the content is measured, the elapsed playing time information is updated to the measured elapsed playing time.

6. The device of claim 5, wherein the original content location information comprises identification information of original content and identification information of a content provider device.

7. The device of claim 5, wherein the additional information is inserted into metadata of the content.

8. A non-transitory computer-readable medium having thereon computer-readable instructions for enabling a computer to perform a content management method, the method comprising:
   generating, by the client device, additional information comprising original content location information of the content at the content provider and information on elapsed playing time of the content on the client device;
   inserting, at the client device, the additional information into content transmitted from a content provider device over a predetermined network, and playing original content from a point corresponding to the information on elapsed playing time of the content on the client device comprised in the additional information after switching to a different device to play the original content; and
   measuring elapsed playing time of the content and updating the elapsed playing time information to the measured elapsed playing time.

9. The non-transitory computer-readable medium of claim 8, wherein the original content location information comprises identification information of original content and identification information of the content provider device.

10. The non-transitory computer readable storage medium of claim 8, wherein the additional information is inserted into metadata of the content.

11. An adaptive content playing method comprising:
generating, by a client device, additional information comprising original content location information of the stored content at the content provider and information on elapsed playing time of the stored content on the client device, for the content stored in the client device which has been transmitted from a content provider device over a predetermined network;
inserting, at a client device, the additional information into the stored content which has been transmitted from the content provider device;
detecting an original content provider device and an original content storage location using the original content location information comprised in the additional information;
playing original content from a point corresponding to the information on elapsed playing time of the content on the client device comprised in the additional information after switching to a different device to play the original content; and
measuring elapsed playing time of the stored content and updating the elapsed playing time information to the measured elapsed playing time.

12. The method of claim 11, wherein the original content location information comprises identification information of original content of the stored content and identification information of the content provider device.

13. The method of claim 11, further comprising:
automatically determining a resource having a resolution compatible to a device which has been switched to after detecting original content.

14. The method of claim 11, wherein the additional information is inserted into metadata of the stored content.

* * * * *